United States Patent
Glenn et al.

(10) Patent No.: US 6,968,830 B2
(45) Date of Patent: Nov. 29, 2005

(54) APPARATUS AND METHOD FOR SUPPRESSING INTERNAL COMBUSTION IGNITION ENGINE EMISSIONS

(75) Inventors: Douglas Glenn, Erie, PA (US); VenkataRamesh Varma Kothapalli, Erie, PA (US); James Robert Mischler, Girard, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/748,510

(22) Filed: Dec. 30, 2003

(65) Prior Publication Data

US 2005/0145222 A1    Jul. 7, 2005

(51) Int. Cl.[7] ............................................. F02D 41/40
(52) U.S. Cl. ....................... 123/501; 123/357; 123/480
(58) Field of Search ........................ 123/357, 480, 123/501, 502

(56) References Cited

U.S. PATENT DOCUMENTS

| | | | | |
|---|---|---|---|---|
| 4,052,971 A | | 10/1977 | Salzgeber et al | 123/364 |
| 4,346,688 A | | 8/1982 | Kaibara et al | 123/502 |
| 4,596,221 A | * | 6/1986 | Ament et al. | 123/501 |
| 4,709,676 A | * | 12/1987 | Monaghan | 123/502 |
| 4,756,292 A | * | 7/1988 | Mischke et al. | 123/501 |
| 5,394,851 A | | 3/1995 | Cryer et al | 123/476 |
| 6,325,044 B1 | | 12/2001 | Chen et al | 123/357 |
| 6,336,436 B1 | | 1/2002 | Miyakubo et al | 123/295 |
| 6,341,596 B1 | | 1/2002 | Dillen et al | 123/500 |
| 6,397,821 B1 | | 6/2002 | Spagele et al | 123/486 |

FOREIGN PATENT DOCUMENTS

| | | |
|---|---|---|
| DE | 43 33 424 B4 | 4/1994 |
| EP | 0 828 071 B1 | 3/1998 |
| EP | 1 132 597 A1 | 9/2001 |

* cited by examiner

Primary Examiner—Tony M. Argenbright
(74) Attorney, Agent, or Firm—Cantor Colburn LLP

(57) ABSTRACT

A method of reducing emissions from a large, medium speed fuel injected diesel engine of the type used on locomotives subject to transient modes of engine operation in which the engine is accelerated or increased loads are applied. The method comprises: monitor at least one operating parameter of the diesel engine; determining, based on such operating parameter, whether the diesel engine is in a transient mode; and controlling a timing of fuel injection to cylinders of the engine, to retard the timing when the diesel engine is in a transient mode relative to the timing of fuel injection when the diesel engine is not in a transient mode of operation.

19 Claims, 8 Drawing Sheets

FIG. 4
Injection Pressure Effect
Plunger Velocity vs. Start of Injection

APPARATUS AND METHOD FOR SUPPRESSING INTERNAL COMBUSTION IGNITION ENGINE EMISSIONS

BACKGROUND OF THE INVENTION

The invention relates generally to the suppression of emissions generation from internal combustion engines and, more particularly, to a fuel injection control system that suppresses emission generation.

Internal combustion engines, such as compression ignition engines are well known for producing black smoke or heavy particulate emissions during acceleration or load ascending transients. One cause of this phenomenon is incomplete fuel-air mixing during the injection and combustion of the fuel injected in compression cylinders during these acceleration and load ascending transient engine operating modes.

A basic combustion process for compression ignitions involves a diffusion type combustion of liquid fuel. As liquid fuel is injected into compressed hot cylinder air, it evaporates and mixes with the surrounding air to form a flammable mixture. This is a continuing process that happens over time as the fuel is injected into the cylinder. The mixture formed initially will combust and raise the local temperature before the later evaporated fuel has time to fully mix with air. As a result, the later burned fuel is subjected to high temperatures with insufficient air to support complete combustion of the fuel. Under such conditions, high temperature pyrolysis of fuel will take place and thus form soot. As the combustion proceeds in the cylinder, a substantial portion of this soot will be burned-up as a result of later exposure to available air in the cylinder. The soot will continue to be burned up in the engine until the power stroke volume expansion sufficiently lowers the cylinder temperature, thereby ceasing the chemical reaction. Any non-combusted soot remaining in the cylinder at this point exits the engine as smoke or particulate emission when the exhaust valve is opened.

In compression ignition engines, therefore, the above-noted soot formation is tempered by soot burn-up. In typical compression ignition engines under typical operating conditions the soot burn-up mechanism sufficiently reduces emissions caused by soot formation. However, in certain engines operating under accelerating or load ascending transient conditions, the soot burn-up mechanism is insufficient for reducing the generation of soot emissions, as is discussed more fully herein below. Engines operating under acceleration or load ascending transient conditions, hereafter referred to as a "transient mode", will often "late burn" injected fuel. During the late burn of injected fuel, adequate time is not provided for the occurrence of the soot burn-up process prior to opening of the exhaust valve. There often is a significant expulsion of smoke and particulate emission in a large compression ignition operating in a transient mode.

Compression ignition engines known in the prior art typically have fixed injection timing via a governor and mechanical linkages which actuate a series of fuel delivery devices simultaneously. Fuel injection start timing is generally predetermined for any given engine operating point and typically cannot be modified for varying conditions. Fuel delivery systems may include pump-line-nozzle configurations or unit injection configurations. An electronic fuel injection system for large cylinder volume displacement compression ignitions is disclosed in U.S. Pat. No. 5,394,851. The referenced fuel injection system is employed in conjunction with a typical compression ignition engine shown generally at 10 in FIG. 1. The engine 10 may be any large compression ignition. Such an engine may include a turbo charger 12 and a series of unitized power assemblies 14. For example, a twelve-cylinder engine has twelve such power assemblies while a sixteen-cylinder engine has sixteen such power assemblies. The engine 10 further includes an air intake manifold 16, a fuel supply line 18 for supplying fuel to each of the power assemblies 14, a water inlet manifold 20 used in cooling the engine, a lube oil pump 22 and a water pump 24, all as known in the art. An intercooler 26 connected to the turbo charger 12 facilitates cooling of the turbo charged air before it enters a respective combustion chamber inside one of the power assemblies 14. The engine may be a Vee-style type, also as known in the art.

Figure 1:
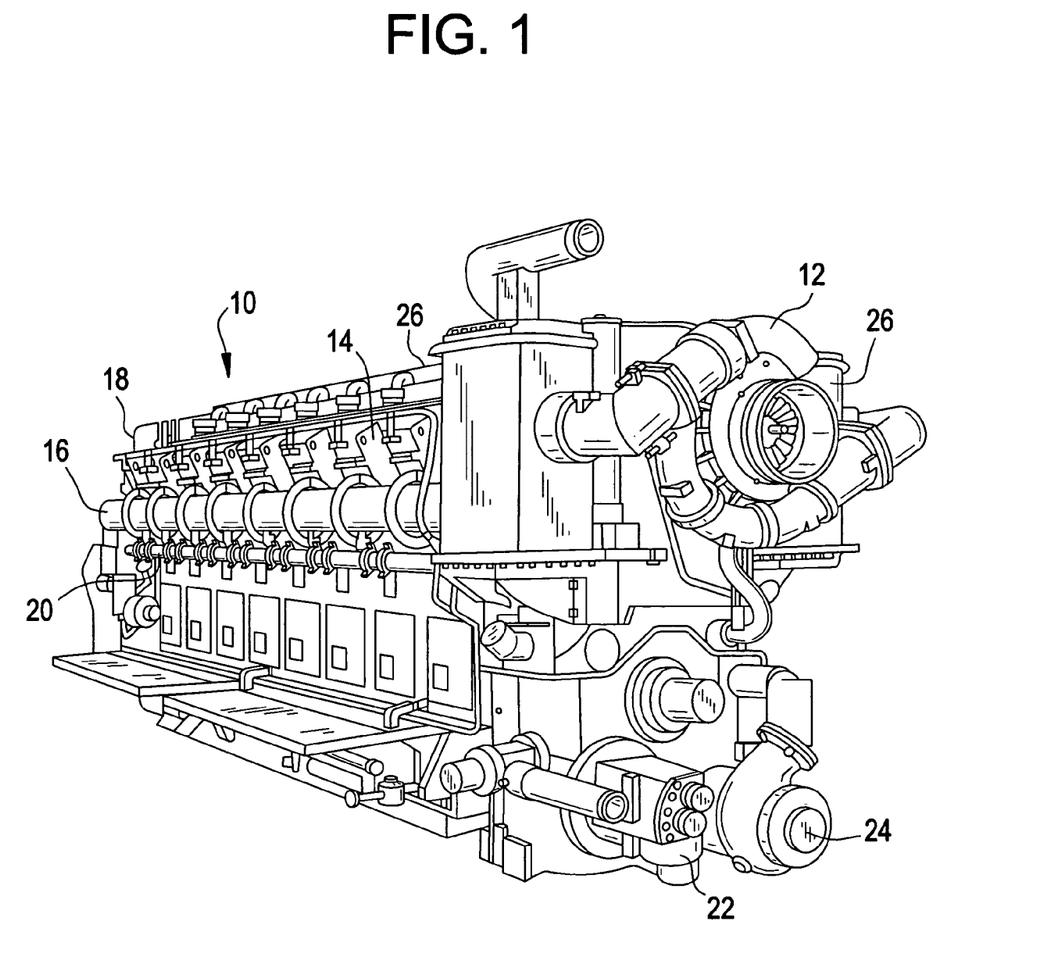
FIG. 1 is a perspective view of a common Vee-style compression ignition engine.

Although well suited for its application, the system of FIG. 1 neither distinguishes nor does it accommodate for accelerating and load ascending transient operating modes and the effect of these operating modes upon the generation of emissions due to late combustion as discussed herein. In such systems, the fuel injection timing of a compression ignition is usually prescribed for each operating condition (speed and load) at its optimum for steady state operation. When the engine is in a transient mode, the injection timing will still be set at its instantaneous value called for by the steady state condition. Operating in a steady state mode, there is usually enough time in the combustion cylinder to control particulate or smoke emissions via the soot burn-up process described above. During a transient mode however, the engine calls for more fuel thus the fuel injection duration becomes longer. The combustion of the added fuel, which enters the cylinder at the end of the injection duration, does not have enough time for soot burn-up before the exhaust valve opens. The result is the increased emission of heavy smoke or particulate matter during the exhaust stage of the engine cycle.

Normal acceleration of a compression ignition (such as a medium speed engine for locomotive applications) puts the engine in a transient mode which varies from a steady state mode and increases the production of soot and particulate emissions. Such engines also encounter radical load changes due to the switching of large auxiliary loads such as compressor loads or fan loads in locomotive applications and "hotel" power loads (an alternator for generating 110 V at 60 hz) for passenger train applications. Driving such loads or turning off such loads can result in load transients on the order of 500 horsepower at any instant. Late burning of injected fuel, as discussed above, is prevalent in such acceleration and load ascending transient compression ignition operating modes. The late burning prevents proper combustion of generated soot and results in increased engine expulsion of smoke and particulate emissions.

BRIEF DESCRIPTION OF THE INVENTION

The disclosed method relates a method of reducing emissions from an internal combustion engine, the method comprising: retarding a fuel injection timing in at least one piston cylinder when the internal combustion engine is in a transient mode.

The disclosed apparatus relates to an apparatus for reducing emissions from a internal combustion engine, the apparatus comprising: an internal combustion engine; an engine monitor for monitoring operating parameters of the internal combustion engine to detect transient modes of operation; and an electronic fuel injection system in communication with the engine monitor and operatively coupled to the internal combustion engine and having a controller to adjust fuel injection timing so as to retard fuel injection to the internal combustion engine when the internal combustion engine is in a transient mode.

The disclosed apparatus also relates to an electronic fuel injection system comprising: an engine transient sensing device; and a control device for retarding fuel injection timing during a transient condition and communicatively coupled to the engine transient sensing device.

Additionally, the disclosed apparatus relates to a storage medium encoded with machine-readable computer program code for electronically controlling a fuel injection, the storage medium including instructions for causing a computer to implement a method comprising: retarding a fuel injection timing in at least one piston cylinder when an internal combustion engine is in a transient mode.

DETAILED DESCRIPTION OF THE INVENTION

Figure 2:
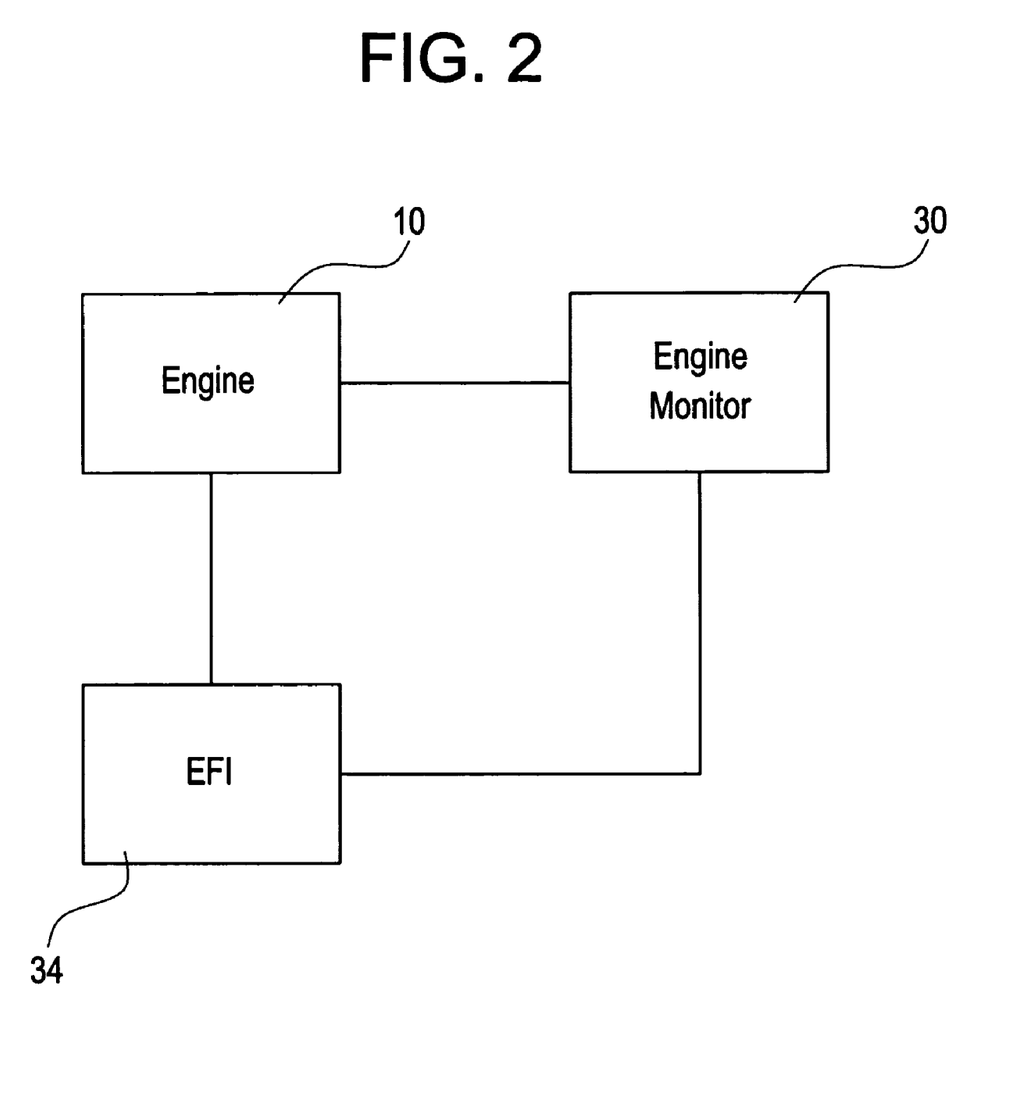
FIG. 2 is a schematic view of the disclosed apparatus.

FIG. 2 is a schematic of one embodiment of the disclosed apparatus for suppressing internal combustion engine emissions. Many of the embodiments are discussed here below with respect to large, medium speed compression ignition engines of the type used on railroad locomotives subject to transient modes of operation, such as arising from changes in engine throttle notch position, differences between commanded and actual engine speed, and the imposition of loads on the engine over short periods of time. A compression ignition engine 10 is shown operatively coupled to an electronic fuel injection system 34. Communicably coupled to the engine 10 and electronic fuel injection system 34 is an engine monitor 30. In this embodiment, the engine monitor 14 monitors the engine, and determines when the engine is in a transient mode. In another embodiment, the electronic fuel injection system 34 may incorporate the engine monitor 30. When in a transient mode, the monitor 30 communicates this information to the electronic fuel injection system 34, and the electronic fuel injection system 34 retards the fuel injection timing of at least one piston cylinder. The fuel injection may be retarded to a point after top dead center ("TDC"). In one embodiment the fuel injection timing may be retarded to a range between about 10 degrees after TDC. This retarding of the fuel injection timing reduces the amount of smoke emissions from compression ignition engines during transient mode operation.

Figure 3:
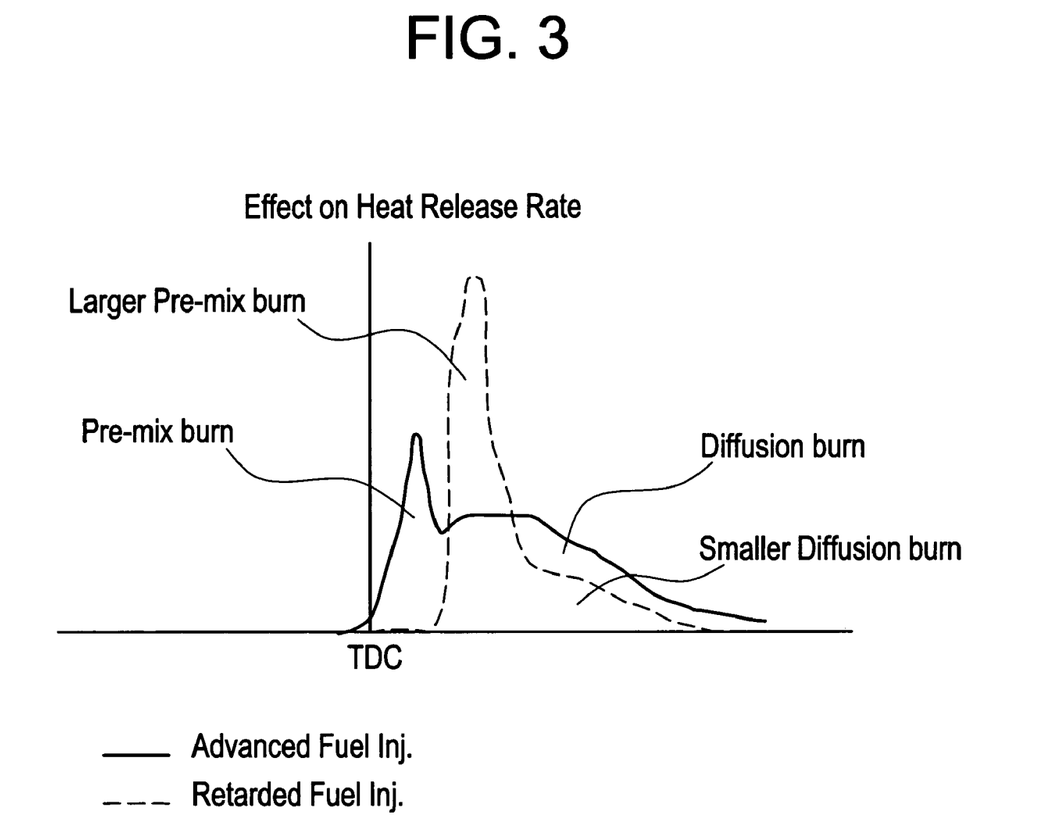
FIG. 3 is a plot showing the Effect on Heat Release Rate.

FIG. 3 shows an Effect on Heat Release Rate plot. The X-axis of FIG. 3 is the crank angle of the piston relative to TDC in degrees, with points to the left of TDC line being "before TDC" and points to the right of TDC being "after TDC". The Y-axis of the effect of Heat Release Rate plot represents the amount of heat release from the combustion of fuel in the cylinder. The advanced fuel injection line is a plot of points for a typical advanced fuel injection in a piston cylinder, where the fuel is injected at about 3 degrees before TDC. There is a spike on the advanced line which is the pre-mix burn. This corresponds to a relatively clean burning of the fuel due to a well-mixed air/fuel combination. Following the pre-mix burn spike is a large extended diffusion burn of the fuel. The diffusion burn corresponds to a relatively dirty burning of the fuel, and is associated with a lack of good mixing between the fuel and air. It has been recently discovered that during transient engine operating conditions, retarding the fuel injection to about 3 to 10 degrees after TDC (as opposed to the commonly accepted wisdom of setting timing to be about 3 degrees before TDC), results in the fuel burning cleaner. The retarded fuel injection line shows a larger pre-mix burn spike than the advanced line. This is due to the fact that since fuel is being injected into the cylinder after TDC, that is, as the cylinder is expanding and pressure is decreasing, it takes more time for the fuel to auto-ignite. This extra time allows for a better mixing of the fuel and air in the piston cylinder, which therefore results in a greater pre-mix burn. Since more of the fuel is burned in a pre-mix state, less fuel is available for the dirtier diffusion burn, hence the diffusion burn under the retarded fuel injection line is smaller and ends more quickly than the diffusion burn of the advanced fuel injection line, which leads to cleaner burning as compared to engines with advanced fuel injection during a transient mode.

Figure 4:
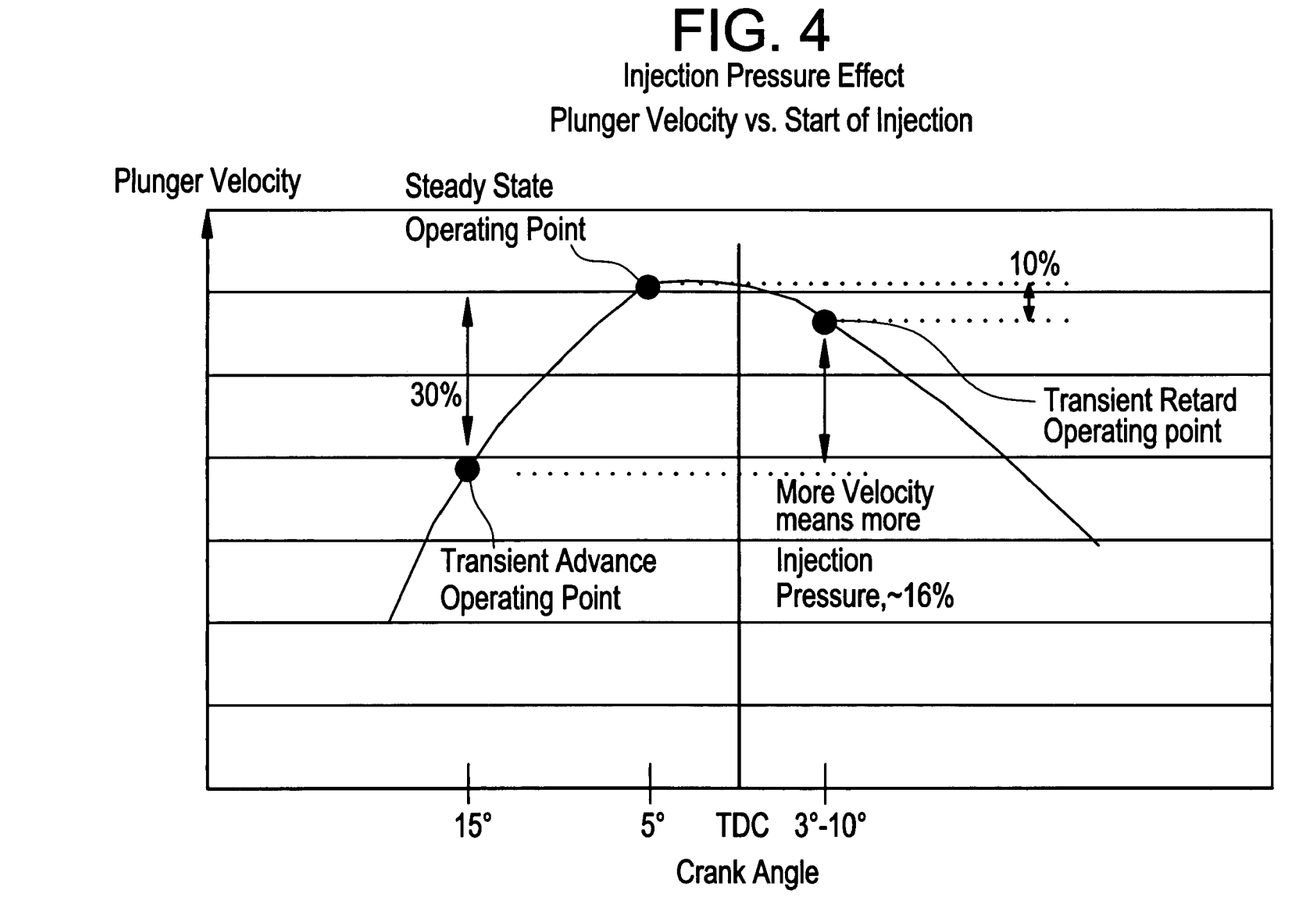
FIG. 4 is a plot showing Plunger Velocity vs. Start of Injection.

FIG. 4 is a plot of plunger velocity versus crank angle relative to TDC for an exemplary compression ignition engine. For steady state operation, shown by the Steady State Operation point, in a typical compression ignition engine, fuel may be typically injected at around 5 degrees before TDC. At that point, the plunger velocity is relatively high. Plunger velocity is directly proportional to fuel injection pressure, thus fuel injection pressure is also relatively high. High fuel injection pressure leads to better mixing between the fuel and the air in the cylinder and thereby produces a cleaner burn. This is one of the reasons why a compression ignition engine burns cleaner during a steady state operation. During transients, it is known to advance the fuel injection to the transient advance point on FIG. 4. The Transient Advance Operating point may be about 15 degrees before TDC in a typical compression ignition engine. The purpose of advancing the injection point for a transient mode is to give the fuel and air more time to mix before auto-ignition, in the hopes of reducing the diffusion burn and producing a cleaner burn. However, at about 15 degrees before TDC the plunger velocity is about 30% less than the plunger velocity at the steady state operating point. Therefore, there is a proportional reduction in injection pressure. With a lower injection pressure, there is less mixing of the fuel and air in the cylinder. Thus, there are at least two competing processes when the fuel injection is advanced: (1) more mixing time is provided, providing a cleaner burn; and (2) less fuel injection pressure is generated, thus reducing the mixing of the fuel and air and providing a less clean burn. If a retarded fuel injection is employed, using about a 3 to 10 degree after TDC injection, as shown with the Transient Retard Operating point in FIG. 4, then there is only about a 10 percent reduction in plunger velocity with respect to the Steady State Operating point. This corresponds to a proportional reduction in fuel injection pressure, which is much smaller than the reduction seen at the typical Transient Advance Operating point, thereby producing a cleaner burn than is achieved by advancing the fuel injection.

Figure 5:
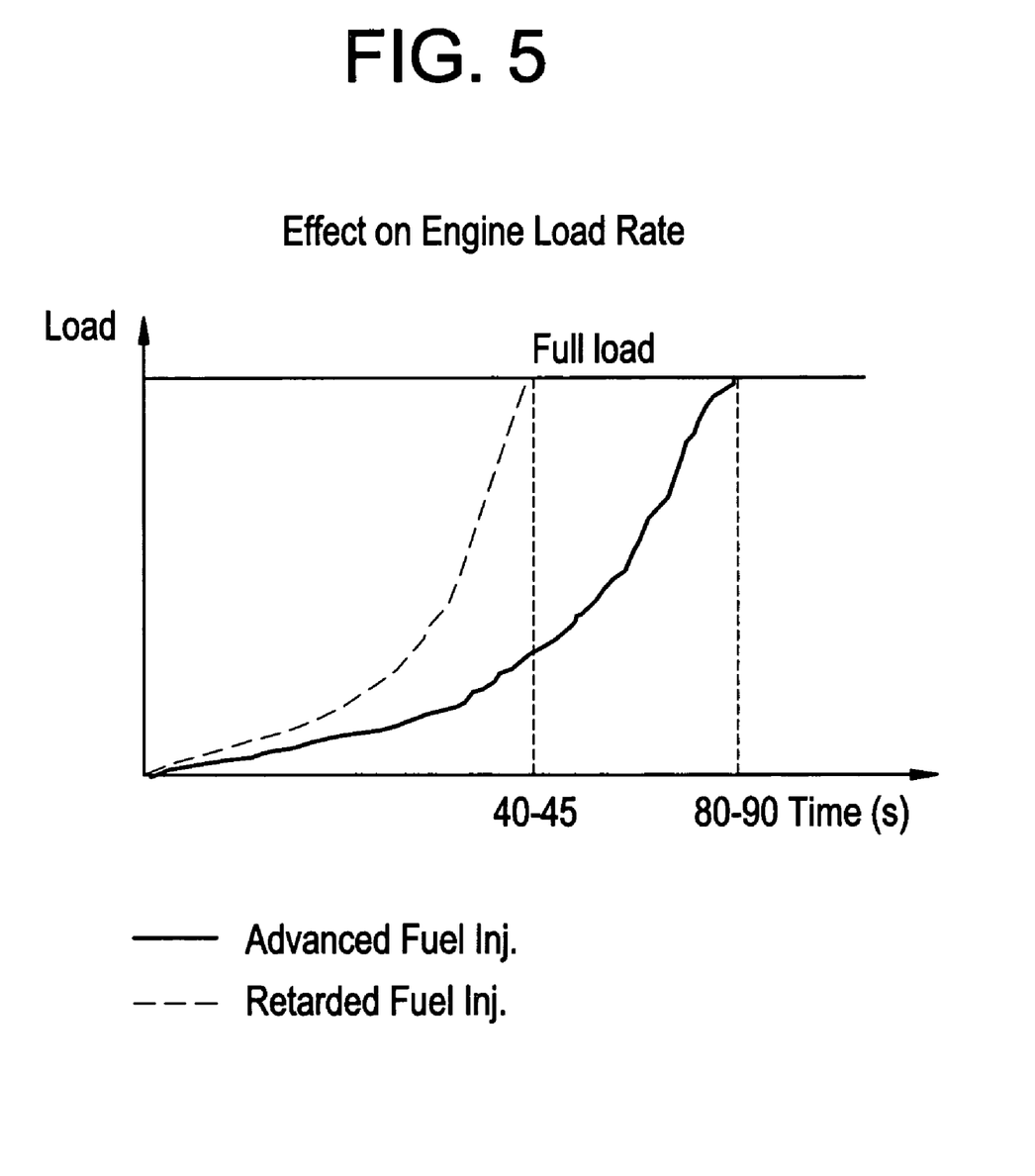
FIG. 5 is a plot showing the Effect on Engine Load Rate.

FIG. 5 shows the Effect on Engine Load Rate on an exemplary compression ignition engine that is required to keep engine emissions at or below a certain specified level. The advanced fuel injection line shows that it takes about 80 to 90 seconds for a compression ignition engine that uses an advanced fuel injection for its transient mode to achieve full load while keeping engine emissions at or below the specified level. On the other hand, when a retarded fuel injection is used for its transient mode, then as the retarded fuel injection line shows, it takes only about 40 to 45 seconds for the engine to achieve full load while keeping engine emissions at or below the certain specified level.

Figure 6:
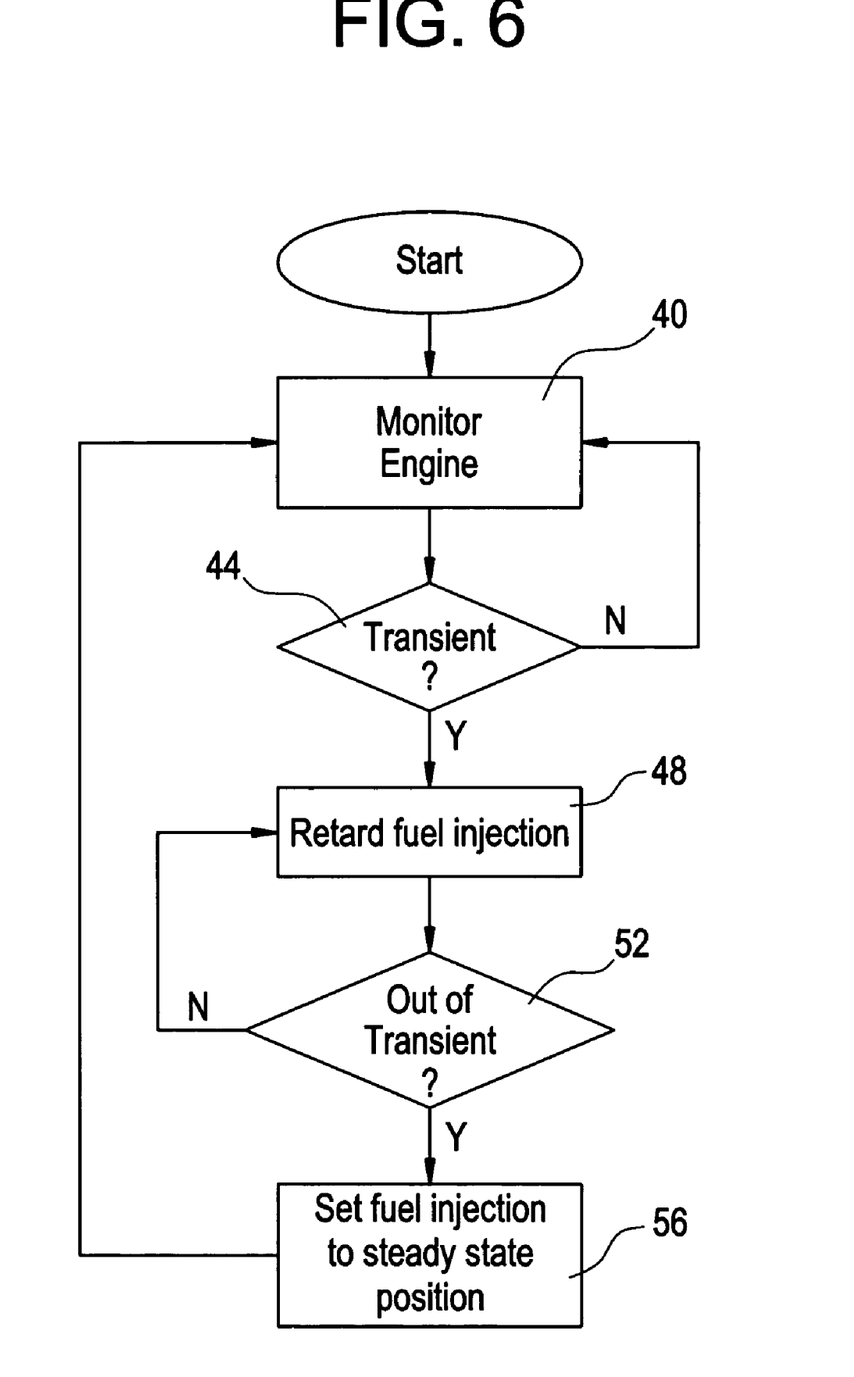
FIG. 6 is a flowchart illustrating an embodiment of the disclosed method.

FIG. 6 shows one embodiment of the disclosed method. At process block 40, the engine monitor 30 monitors the engine. At decision block 44, it is determined whether the engine is in a transient mode. To determine whether the engine is in a transient mode at decision block 44, the engine monitor 30 may analyze data such as, but not limited to: throttle position, engine speed, power from an alternator field controller, crankshaft speed, engine acceleration, alternator frequency, cylinder firing frequency, alternator power, fueling level, intake manifold pressure, exhaust manifold pressure, exhaust manifold temperature, turbocharger speed, fuel pressure, water pressure, oil pressure, horsepower. At process block 48, the electronic fuel injection system retards the fuel injection, that is, it delays the fuel injection until about 3 to 10 degrees after TDC. At decision block 52, the engine monitor determines whether the engine is out of the transient mode. To determine whether the engine is out of the transient mode at decision block 52, the engine monitor 30 may analyze data such as, but not limited to: throttle position, engine speed, power from an alternator field controller, crankshaft speed, engine acceleration, alternator frequency, cylinder firing frequency, alternator power, fueling level, intake manifold pressure, exhaust manifold pressure, exhaust manifold temperature, turbocharger speed, fuel pressure, water pressure, oil pressure, horsepower. The acts described in FIG. 6 may be implemented mechanically.

Figure 7:
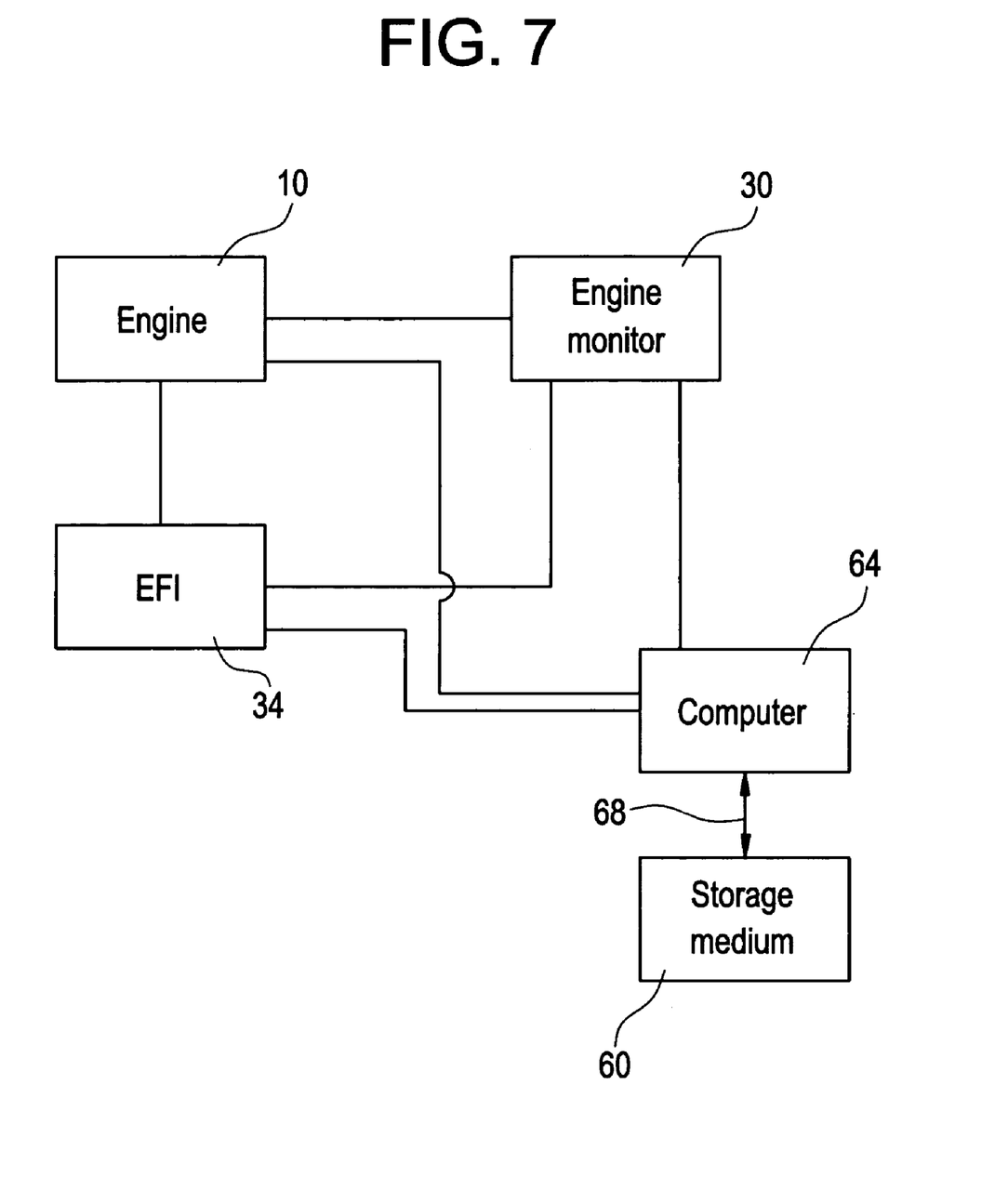
FIG. 7 is a schematic view of another embodiment of the disclosed apparatus.

Referring to FIG. 7, the method disclosed in FIG. 6 may be embodied in the form of computer-implemented processes and apparatuses for practicing those processes. The disclosed method may also be embodied in the form of a computer program code containing instructions embodied in tangible media, such as floppy diskettes, CD-ROMs, hard drives, or any other computer-readable storage medium 60, wherein, when the computer program code is loaded into and executed by a computer 64, the computer becomes an apparatus for practicing the invention. The present method may also be embodied in the form of computer program code, for example, whether stored in a storage medium 60, loaded into and/or executed by a computer 64, or transmitted via a data signal 68 over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
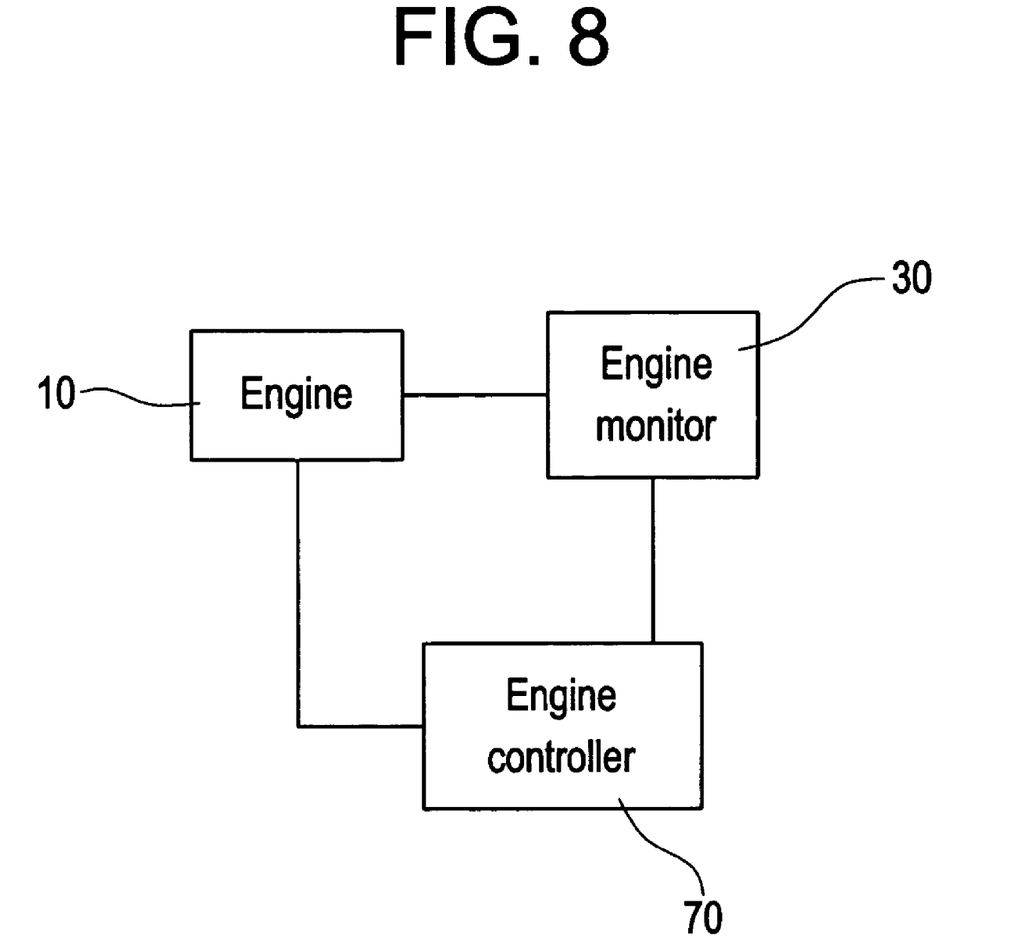
FIG. 8 is a schematic view of another embodiment of the disclosed apparatus.

FIG. 8 shows a schematic of another embodiment of the disclosed apparatus. An engine 10 is in operable communication with an engine monitor 30 and an engine controller 70. The engine monitor 30 and engine controller 70 are also in operable communication with each other. In this embodiment, the acts described in FIG. 6 may be configured to implemented mechanically or they may be configured to be implemented electronically.

A technical contribution of the disclosed method and apparatus is that it provides for a computer controlled fuel injection system which reduces the emissions from an internal combustion ignition engine by retarding the fuel injection during transient operation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method of reducing emissions from a large, medium speed fuel injected diesel engine of the type used on locomotives subject to transient modes of engine operation in which the engine is accelerated or increased loads are applied, the method comprising:
    monitoring at least one operating parameter of the diesel engine;
    determining, based on such operating parameter, whether the diesel engine is in a transient mode;
    controlling timing of fuel injection to cylinders of the engine by retarding the timing when the diesel engine is in a transient mode relative to the timing of fuel injection when the diesel engine is not in a transient mode of operation;
    maintaining retarding the timing when the diesel engine is in the transient mode;
    determining, after the diesel engine has been operating in a transient mode, whether the diesel engine is then operating out of the transient mode; and
    advancing the fuel injection timing for the diesel engine, if the diesel engine is no longer in the transient mode.

2. The method of claim 1 wherein the controlling timing of fuel injection to cylinders of the engine by retarding the timing, is to more than about 3 degrees after top dead center (TDC).

3. The method of claim 1 wherein the controlling timing of fuel injection to cylinders of the engine by retarding the timing, is to less than about 10 degrees after TDC.

4. The method of claim 1, wherein the determining whether the engine is in a transient mode comprises:
    monitoring a parameter indicative of the difference between a commanded engine speed and actual engine speed.

5. The method of claim 1, wherein the determining whether the engine is in a transient mode comprises:
    monitoring a parameter indicative of an engine throttle position.

6. The method of claim 1, wherein the determining whether the engine is in a transient mode comprises:
    monitoring a parameter indicative of the imposition of a load on the engine.

7. An apparatus for reducing emissions from a large, medium speed fuel injected diesel internal combustion engine of the type used on a locomotive subject to transient modes of engine operation in which the engine is accelerated or increased loads are applied, the apparatus comprising:
    a large, medium speed fuel injected diesel internal combustion engine;

an engine monitor for monitoring at least one operating parameter of the engine indicative of whether the engine is in a transient mode of operation;

an electronic fuel injection system in communication with the engine monitor and operatively coupled to the engine, the electronic fuel injection being adjustable so as to selectively initiate fuel injection at a predetermined timing relative to TDC of pistons in cylinders of the engine, the electronic fuel injection system comprising:

a controller for controlling the operation of the fuel injection system, with the controller being configured to retard the fuel injection timing to the engine when the engine is in a transient mode relative to the timing of fuel injection when the engine is not in a transient mode of operation and being configured to determine, after the diesel engine has been operating in a transient mode, whether the diesel engine is then operating out of the transient mode, and to advance the fuel injection timing for the diesel engine, if the diesel engine is no longer in the transient mode.

8. The apparatus of claim 7, wherein the controller retards the fuel injection timing in each engine cylinder to more than about 3 degrees after TDC.

9. The apparatus of claim 7, wherein the controller retards the fuel injection timing in each engine cylinder to less than about 10 degrees after TDC.

10. The apparatus of claim 7, wherein the engine monitor monitors a parameter indicative of an engine throttle position.

11. The apparatus of claim 7, wherein the engine monitor monitors a parameter indicative of the difference between a commanded engine speed and actual engine speed.

12. The apparatus of claim 7, wherein the engine monitor monitors a parameter indicative of the imposition of a load on the engine.

13. An electronic fuel injection system for reducing emissions from a large, medium speed fuel injected diesel engine of the type used on locomotives subject to transient modes of engine operation in which the engine is accelerated or increased loads are applied comprising:

an engine monitor for monitoring at least one parameter of engine operation indicative of a transient mode of engine operation;

a controller in communication with the engine monitor and a diesel engine, with the controller being configured to retard a fuel injection timing to the diesel engine when the diesel engine is in a transient mode relative to the timing of fuel injection when the diesel engine is not in a transient mode of operation, and to determine, after the diesel engine has been operating in a transient mode, whether the diesel engine is then operating out of the transient mode, and to advance the fuel injection timing for the diesel engine, if the diesel engine is no longer in the transient mode.

14. The electronic fuel injection system of claim 13 wherein the controller is further configured to retard fuel injection timing to more than about 3 degrees after TDC.

15. The electronic fuel injection system of claim 13, wherein the controller is further configured to retard fuel injection timing to more than about 3 degrees after TDC.

16. The electronic fuel injection system of claim 13 wherein the engine monitor monitors a parameter indicative of an engine throttle position.

17. The electronic fuel injection system of claim 13 wherein the engine monitor monitors a parameter indicative of the difference between a commanded engine speed and actual engine speed.

18. The electronic fuel injection system of claim 13 wherein the engine monitor monitors a parameter indicative of the imposition of a load on the diesel engine.

19. A storage medium encoded with machine-readable computer program code for electronically controlling timing of fuel injection for a large, medium speed fuel injected diesel engine of the type used on locomotives subject to transient modes of engine operation in which the engine is accelerated or increased loads are applied, the storage medium including instructions for causing a computer to implement a method comprising:

monitoring at least one operating parameter of the diesel engine;

determining, based on such operating parameter, whether the diesel engine is in a transient mode;

retarding fuel injection timing to cylinders of the engine when a diesel engine is in a transient mode relative to the timing of fuel injection when the diesel engine is not in a transient mode of operation;

maintaining retarding the timing when the diesel engine is in the transient mode;

determining, after the diesel engine has been operating in a transient mode, whether the diesel engine is then operating out of the transient mode; and advancing the fuel injection timing for the diesel engine, if the diesel engine is no longer in the transient mode.

* * * * *

UNITED STATES PATENT AND TRADEMARK OFFICE
CERTIFICATE OF CORRECTION

PATENT NO. : 6,968,830 B2
DATED : November 29, 2005
INVENTOR(S) : Glenn et al.

It is certified that error appears in the above-identified patent and that said Letters Patent is hereby corrected as shown below:

<u>Column 8,</u>
Line 14, after "about" delete "3" and insert -- 10 --.

Signed and Sealed this

Eighteenth Day of April, 2006

JON W. DUDAS
*Director of the United States Patent and Trademark Office*